US010674663B2

(12) United States Patent
Kirchbeck et al.

(10) Patent No.: US 10,674,663 B2
(45) Date of Patent: Jun. 9, 2020

(54) AGRICULTURAL HARVESTING SYSTEM

(71) Applicant: CLAAS SELBSTFAHRENDE ERNTEMASCHINEN GMBH, Harsewinkel (DE)

(72) Inventors: Alexander Kirchbeck, Drensteinfurt (DE); Stefan Sander, Versmold (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 299 days.

(21) Appl. No.: 15/888,481

(22) Filed: Feb. 5, 2018

(65) Prior Publication Data

US 2018/0242523 A1    Aug. 30, 2018

(30) Foreign Application Priority Data

Feb. 27, 2017    (DE) .......................... 10 2017 104 009

(51) Int. Cl.
*A01D 41/127*    (2006.01)
*A01D 43/08*    (2006.01)
(Continued)

(52) U.S. Cl.
CPC ............ *A01D 41/1277* (2013.01); *A01C 7/00* (2013.01); *A01C 21/005* (2013.01);
(Continued)

(58) Field of Classification Search
CPC .............. A01D 41/127; A01D 41/1243; A01D 41/1277; A01D 41/1271; A01D 41/1272;
(Continued)

(56) References Cited

U.S. PATENT DOCUMENTS 7,487,024 B2 *    2/2009    Farley ................ A01D 41/1243
701/50
7,540,129 B2 *    6/2009    Kormann ............. A01D 41/141
460/1
(Continued)

FOREIGN PATENT DOCUMENTS

DE            102 36 515 C1      9/2003
DE     10 2008 056 557 A1      5/2010
(Continued)

OTHER PUBLICATIONS

European Search Report dated Jul. 17, 2018 with English translation.

*Primary Examiner* — Robert E Pezzuto
(74) *Attorney, Agent, or Firm* — Collard & Roe, P.C.

(57) ABSTRACT

An agricultural harvesting system has an agricultural harvesting machine with at least one agricultural working unit that performs agricultural work, and an adjusting unit for adjusting the parameters of the particular working unit, a conveyor channel for a crop stream generated in a harvesting process by harvesting a field of crop, and an NIR sensor unit containing an NIR sensor which is configured for detecting constituents and/or properties of the crop stream. The crop stream in the conveyor channel can be guided past the NIR sensor. An on-line data processing unit controls the particular working unit, and generates control data on the basis of crop stream data which have been generated by the NIR sensor unit and correspond to the constituents and/or properties detected by the NIR sensor, and the adjusting unit carries out a parameter adjustment of the particular working unit on the basis of the control data.

20 Claims, 2 Drawing Sheets

(51) Int. Cl.
*G01N 21/3554* (2014.01)
*G01N 21/3563* (2014.01)
*G01N 21/359* (2014.01)
*A01C 7/00* (2006.01)
*A01C 21/00* (2006.01)
*A01D 41/14* (2006.01)

(52) U.S. Cl.
CPC ......... *A01D 41/141* (2013.01); *A01D 43/085* (2013.01); *G01N 21/359* (2013.01); *G01N 21/3554* (2013.01); *G01N 21/3563* (2013.01)

(58) Field of Classification Search
CPC ...... A01D 43/085; A01F 12/40; B60W 50/08; B60W 50/085; B60W 50/0098; B60W 10/06; B60W 10/30; G05B 13/021; G01N 21/359; G01N 21/3554; G01N 21/3563
USPC ........... 56/10.2 R; 239/675, 677; 460/1, 111, 460/112; 701/50
See application file for complete search history.

(56) References Cited

U.S. PATENT DOCUMENTS

| | | | |
|---|---|---|---|
| 8,010,262 B2* | 8/2011 | Schroeder | A01D 41/1243 701/50 |
| 8,019,517 B2* | 9/2011 | Boenig | A01D 43/085 460/1 |
| 8,954,224 B2 | 2/2015 | Behnke et al. | |
| 9,516,812 B2* | 12/2016 | Baumgarten | A01D 41/127 |
| 9,894,836 B2* | 2/2018 | Garton | A01D 41/1271 |
| 2016/0052525 A1* | 2/2016 | Tuncer | B60W 50/085 701/50 |
| 2016/0088794 A1 | 3/2016 | Baumgarten et al. | |

FOREIGN PATENT DOCUMENTS

| | | |
|---|---|---|
| EP | 1407654 | 4/2004 |
| EP | 1 639 878 A2 | 3/2006 |
| EP | 2 132 974 A1 | 12/2009 |

\* cited by examiner

AGRICULTURAL HARVESTING SYSTEM

CROSS-REFERENCE TO RELATED APPLICATIONS

This application claims priority under 35 USC 119 of German Application No. 10 2017 104 009.9, filed on Feb. 27, 2017, the disclosure of which is herein incorporated by reference.

BACKGROUND OF THE INVENTION

The invention relates to an agricultural harvesting system comprising an agricultural harvesting machine.

The related art (EP 1 407 654 B1) describes agricultural harvesting systems comprising an agricultural harvesting machine which includes a sensor unit for detecting the constituents in the agricultural crop. The sensor unit comprises a sensor which operates on the basis of near-infrared spectroscopy (NIR sensor) and past which a crop stream can be conveyed. A crop stream is understood to mean, in this case, crop which has been harvested by means of the harvesting machine and which is transported through a conveyor channel of the harvesting machine. The NIR sensor is usually situated in a wall of the conveyor channel in this case and detects the intensity of the light reflected by the particles in the crop stream, which are flowing past, in a wavelength-resolved manner. In this case, the crop stream is acted upon by broadband, i.e., white, light. In this way, the individual light-stimulated modes of oscillation of individual constituents of the crop to be identified, which take effect via absorption, diffusion, or extinction, can be detected.

NIR sensors have proven to be particularly advantageous for the detection of constituents of the crop that are relevant for an addition of an ensilage agent. Ensilage agents are used for the preparation or handling of crop, in particular, in order to improve the fermentation process in the silo. During the harvesting process, an ensilage agent unit generally mixes an acid with water in a ratio that is dependent on the crop properties and injects the mixture into the crop stream.

In order to control the ensilage agent unit, the crop stream data measured by the NIR sensor are fed to a data processing unit which calculates the particular content of the constituents of interest (e.g., sugar content, protein content, crude ash portion, and/or raw fiber portion). The data processing unit then generates suitable control data on the basis of the crop stream data, via which the ensilage agent unit and, therefore, the addition of ensilage agent into the crop stream is controlled.

Independently thereof, it is also known with respect to harvesting machines to adjust and control various agricultural working units thereof, wherein the adjustment or control of the working units takes place on the basis of data from various further sensors. In this case, an agricultural working unit is understood to mean, in particular, an agricultural work-assisting or -performing component of the harvesting machine that mechanically acts on the crop. In the case of a forage harvester, these are, for example, the header, the cutting cylinder, feed devices, conveying and accelerating devices for the crop, the lifting mechanism for adjusting the height of the header, or the like.

With respect to the related art, it is problematic that the plurality of sensors necessary for controlling the different processes of the harvesting machine is associated with a relatively great complexity of installation and maintenance.

SUMMARY OF THE INVENTION

The problem addressed by the invention is that of providing an agricultural harvesting system which ensures a reduced complexity of installation and maintenance of the harvesting machine.

According to a first teaching of the invention, the aforementioned problem is solved in the case of an agricultural harvesting system comprising an agricultural harvesting machine which includes at least one agricultural working unit which is configured for assisting or performing agricultural work, and an adjusting unit for adjusting the parameters of the particular working unit, a conveyor channel for a crop stream generated in a harvesting process by harvesting a field of crop, and an NIR sensor unit containing an NIR sensor which is configured for detecting constituents and/or properties of the crop stream. The crop stream in the conveyor channel can be guided past the NIR sensor. There is an on-line data processing unit for controlling the particular working unit, which is configured for generating control data on the basis of crop stream data which have been generated by the NIR sensor unit and correspond to the constituents and/or properties detected by the NIR sensor. The adjusting unit is configured for carrying out a parameter adjustment of the particular working unit at least on the basis of the control data.

The agricultural harvesting machine of the agricultural harvesting system according to the invention is, in particular, a forage harvester, for example a corn harvester. The harvesting system or the harvesting machine comprises one or multiple agricultural working units for assisting or performing agricultural work. The working units are configured, in particular, for mechanically acting on the crop. Suitable working units in the case of a harvesting machine are, for example, a cutting cylinder, a feed device upstream from the cutting cylinder for feeding crop to the cutting cylinder, a rechopper downstream from the cutting cylinder, a crop conveying or accelerating device downstream from the rechopper, or a header which cuts the plants in the field of crop and directs the plants, as the crop stream, into the harvesting machine. In addition to agricultural working units, the harvesting machine can also comprise an ensilage agent unit which injects an ensilage agent into the crop stream.

The harvesting machine of the agricultural harvesting system according to the invention comprises a conveyor channel, through which the crop stream, which has been generated during a harvesting process by harvesting a field of crop, is directed. The crop stream means the crop directed or flowing through the conveyor channel. In this case, the crop is drawn in at the front end of the harvesting machine, in the region of the header, and is directed via the cutting cylinder to a transfer pipe, from which the crop emerges again, for example into a hauling vehicle for transporting the crop to a silo.

Furthermore, situated in the transfer pipe or in another portion of the conveyor channel is an NIR sensor of an NIR sensor unit, which is configured for detecting constituents and/or properties of the crop stream by way of the crop stream in the conveyor channel being guided past the NIR sensor.

According to the invention and as stated above, the harvesting machine of the agricultural harvesting system further comprises an adjusting unit for adjusting the parameters of the particular working unit. The adjusting unit is configured for carrying out at least one parameter adjustment of the particular working unit. The control data are generated by an on-line data processing unit for controlling the particular working unit, which, in particular, is a component of the harvesting machine and preferably of the NIR sensor unit, on the basis of the crop stream data generated by the NIR sensor unit, in accordance with the detected constituents and/or properties.

The on-line data processing unit for controlling a working unit means a data processing unit which processes the crop stream data, which underlies the control of the working unit and is generated by the NIR sensor unit, in a manner temporally coupled to the generation and/or receipt thereof. The processing of the crop stream data by the on-line data processing unit takes place in real time, in particular, in this case. The term "real time" is to be broadly interpreted in this context and means that the processing of the received crop stream data takes place within a predefined time period starting with the receipt and/or generation of the crop stream data, which is, at most, one half of an hour, preferably at most a few seconds, e.g., at most 30 seconds, particularly at most a few fractions of seconds, e.g., at most one half of a second.

Of essential importance is the finding that the constituents and/or properties detected by the NIR sensor and the corresponding crop stream data generated by the NIR sensor unit are also suitable or can be utilized for controlling at least one agricultural working unit of the harvesting machine and/or the agricultural harvesting system according to the invention. The NIR sensor can therefore replace multiple further sensors which, so far, were additionally necessary in the related art in order to control the various working units and the different processes of a harvesting machine. Therefore, the range of functions of the NIR sensor unit known per se or of NIR sensors known per se is substantially expanded with respect to the related art by way of the harvesting system according to the invention. As a result, the total number of sensors of the harvesting machine can be reduced, whereby the installation and maintenance complexity thereof can also be reduced.

The aforementioned adjusting unit is configured, in particular, in such a way that the at least one parameter adjustment is carried out during the same harvesting process in which the constituents and/or properties of the crop stream are also detected by the NIR sensor, which, in particular, is temporally coupled to the generation and/or the receipt of the crop stream data. It is therefore possible to immediately respond to changes in the field of crop and/or in the crop, which have been detected by the NIR sensor, by changing one or multiple parameters of the particular working unit or suitably adjusting the working unit.

An agricultural working unit, according to the invention, is, in particular, an agricultural working unit which is configured for handling, in particular transporting (feed device, conveyance device, etc.) and/or shredding (header, cutting cylinder, etc.), crop in the crop stream. Preferably, the working unit is a component of the agricultural harvesting machine of the harvesting system.

According to one embodiment, the agricultural harvesting machine of the agricultural harvesting system according to the invention comprises, as the working unit, a rechopper for the crop in the crop stream, wherein the adjusting unit is configured for carrying out, as the parameter adjustment, the adjustment of the gap width and/or the drive power of the rechopper. Such a rechopper is specifically utilized for breaking open the fruit or the grains, in particular the corn kernels, and therefore making them digestible. In this rechopping process, it must be taken into account that a kernel having a relatively high moisture content and a correspondingly low content of dry mass is relatively soft and rubbery and, in this state, is more difficult to break open than a drier kernel having a higher dry mass content. The starch portion in the kernel also influences the function of the rechopper. The NIR sensor makes it possible, in this case, to determine the dry mass content and/or the starch content of the kernel and, depending thereon, to effectuate a parameter adjustment of the rechopper. For example, when a relatively low dry mass content and/or starch portion of the kernel are/is measured, the gap width of the rechopper is reduced, whereas, in contrast, the gap width is increased when a relatively high dry mass content and/or starch portion are/is measured. Additionally or alternatively, the drive power of the rechopper can be suitably adjusted depending on the measured dry mass content and/or starch portion of the kernel.

According to another embodiment, the agricultural harvesting machine of the agricultural harvesting system according to the invention comprises a header as the working unit, wherein the adjusting unit is configured for carrying out the adjustment of the cutting height of the crop as the parameter adjustment. A change in the cutting height can be desirable, for example, when the crop is to be further processed as feed and a relatively high raw fiber portion in the crop stream is measured by the NIR sensor. The fiber components of the crop have no noteworthy feed value and are therefore undesirable in this case. In principle, the crop can also be utilized as a substrate for biogas plants, wherein a comparatively high raw fiber portion can then be desirable. In principle, the cutting height also influences the portion of crude ash, in particular sand, in the crop stream, which, in turn, increases the wear within the machine and can result in improper fermentation in the silo. The raw fiber portion and the portion of crude ash in the crop stream can therefore be changed by changing the cutting height, which takes place via a parameter adjustment of the header.

According to a particular embodiment, the agricultural harvesting machine of the agricultural harvesting system according to the invention comprises a feed device and a cutting cylinder as working units, wherein the adjusting unit is configured for carrying out the adjustment of the length of cut of the crop as the parameter adjustment. The length of cut can be changed, inter alia, by way of the speed of the feed of the crop to the cutting cylinder by means of the feed device and/or by way of the speed of the cutting cylinder. A suitable parameter adjustment of the feed device and/or the cutting cylinder can also take place, in this case, on the basis of constituents and/or properties detected by the NIR sensor or by the NIR sensor unit based on generated crop stream data, for example the dry mass content and/or raw fiber content of the crop measured by the NIR sensor. A reduction of the length of cut is required, for example, when the dry mass content and/or raw fiber content of the crop, i.e., the totality of kernels, leaves, and stalks, is comparatively high, which would make a subsequent compression in a silo, in particular a bunker silo, difficult. If the dry mass content and/or raw fiber portion of the crop is relatively low, however, the length of cut can also be selected to be greater.

Additionally or alternatively to the above-described embodiments which have more precisely defined the on-line data processing unit, the agricultural harvesting system can further comprise an off-line data processing unit.

In this case, the harvesting machine of the agricultural harvesting system also comprises a data transmission unit which is configured for transmitting crop stream data, which have been generated by the NIR sensor unit and correspond to the constituents and/or properties detected by the NIR sensor, to the off-line data processing unit for the processing of the crop stream data in a manner temporally decoupled from the generation and/or receipt thereof. In particular, the off-line data processing unit is configured for generating, at least on the basis of the crop stream data generated by the NIR sensor unit, control data for controlling an agricultural working process downstream from the harvesting process. Of essential important in this case is the finding that the crop stream data generated by the NIR sensor unit is also suitable or can be utilized for planning and carrying out, i.e., controlling, in the broadest sense, one or multiple agricultural working processes downstream from the harvesting process. The range of functions of the known NIR sensor unit or of the known NIR sensor is therefore even further expanded with respect to the related art by way of the presence of an on-line data processing unit. The planning and carrying out of working processes downstream from the harvesting process can therefore be simplified and optimized.

In this case, the off-line data processing unit can also optionally additionally access sensor data, in particular crop stream data, at least from one further sensor which, in particular, is not an NIR sensor, but rather, for example, a camera which, in particular, detects external crop properties of the crop stream or of the flowing particles (crop quality camera).

Various examples of data can be generated by the additional off-line data processing unit, in principle, however, also the on-line data processing unit, on the basis of the crop stream data received from the NIR sensor unit. The generated crop stream data are then compared with corresponding reference data which can be stored in the particular data processing unit or can be fed thereto. On the basis of the comparison, the aforementioned control data for controlling an agricultural working process or the agricultural working process downstream from the harvesting process are then generated.

According to yet another embodiment of the harvesting system, the off-line data processing unit can finally also be configured for generating additional control data for the adjusting unit on the basis of crop stream data which have been generated by the NIR sensor unit and correspond to the constituents and/or properties detected by the NIR sensor (protein content, protein type, sugar content, starch content, fat content and/or dry mass content, etc., of the kernel; dry mass content, raw fiber portion, crude ash portion, volumetric energy density and/or gravimetric energy density, etc. of the crop), wherein the adjusting unit is configured for additionally adjusting the particular working unit also on the basis of the additional control data.

According to one embodiment, not only the on-line data processing unit, but also the off-line data processing unit is configured for generating data regarding the dry mass content and/or starch portion of the fruit of the harvested field of crop, carrying out a comparison of the generated data with reference data and, on the basis of the comparison, generating the control data for carrying out the parameter adjustment of the rechopper, wherein the adjusting unit is configured for carrying out the adjustment of the gap width and/or the drive power of the rechopper (5) as the parameter adjustment, and/or generating data regarding the raw fiber portion of the harvested field of crop, carrying out a comparison of the generated data with reference data and, on the basis of the comparison, generating the control data for carrying out the parameter adjustment of the header, wherein the adjusting unit is configured for carrying out the adjustment of the cutting height of the crop as the parameter adjustment, and/or generating data regarding the crude ash portion of the harvested field of crop, carrying out a comparison of the generated data with reference data and, on the basis of the comparison, generating the control data for carrying out the parameter adjustment of the header, wherein the adjusting unit is configured for carrying out the adjustment of the cutting height of the crop as the parameter adjustment, and/or generating data regarding the dry mass content of the harvested field of crop, carrying out a comparison of the generated data with reference data and, on the basis of the comparison, generating the control data for carrying out the parameter adjustment of the feed device and/or the cutting cylinder, wherein the adjusting unit is configured for carrying out the adjustment of the length of cut of the crop as the parameter adjustment, and/or generating data regarding the raw fiber portion of the harvested field of crop, carrying out a comparison of the generated data with reference data and, on the basis of the comparison, generating the control data for carrying out the parameter adjustment of the feed device and/or the cutting cylinder, wherein the adjusting unit is configured for carrying out the adjustment of the length of cut of the crop as the parameter adjustment.

According to one embodiment, the agricultural harvesting system further comprises a position-finding system. This can be, in this case, a GPS sensor or geosensor which communicates with a GPS satellite. In particular, the GPS sensor or geosensor is a component of the agricultural harvesting machine. In this case, the on-line data processing unit and/or the off-line data processing unit is configured for assigning generated geodata to the crop stream data from the position-finding system and/or processing georeferenced crop stream data. Geodata means data which define a spatial position on the earth's surface, i.e., allow for a position determination. By way thereof, the crop stream data can be unambiguously assigned to a certain position on the earth's surface (so-called georeferencing). Additionally or alternatively, the agricultural harvesting system can also comprise a display unit, with the aid of which the crop stream data, reference data, control data, and/or geodata can be displayed. A camera can also be provided as a further sensor, wherein the sensor or the camera is configured for detecting external properties of the crop stream.

Finally, the on-line data processing unit and/or the off-line data processing unit can be a component of the agricultural harvesting machine or of a data processing center which is stationary, in particular, and is spatially separated from the agricultural harvesting machine (at least during the harvesting process) and, in particular, is a component of the harvesting system. In principle, it is also conceivable that the on-line data processing unit and/or the off-line data processing unit are/is a component of the agricultural harvesting machine and of the data processing center which is spatially separated therefrom, i.e., is designed as multiple parts in this case.

The invention also relates to a method for operating an above-defined agricultural harvesting machine, in the case of which the particular working unit is controlled at least on the basis of the control data which have been generated by the on-line data processing unit on the basis of the data transmitted by the NIR sensor unit.

According to one embodiment of the method according to the invention, the data transmission unit transmits crop stream data, which have been generated by the NIR sensor unit and correspond to the constituents and/or properties detected by the NIR sensor, to the off-line data processing unit which, in turn, processes the crop stream data in a manner temporally decoupled from the generation and/or receipt thereof.

BRIEF DESCRIPTION OF THE DRAWINGS

The invention is explained in the following in greater detail with reference to a drawing representing only one exemplary embodiment. In the drawing.

DETAILED DESCRIPTION OF THE EMBODIMENTS

The agricultural harvesting system according to the invention and the method according to the invention allows for a control and, in particular, parameter adjustment of one or multiple agricultural working units 2, 3, 4, 5 which, in particular, are a component of the harvesting machine 1 of the agricultural working system and are utilized for assisting or performing agricultural work.

Figure 1:
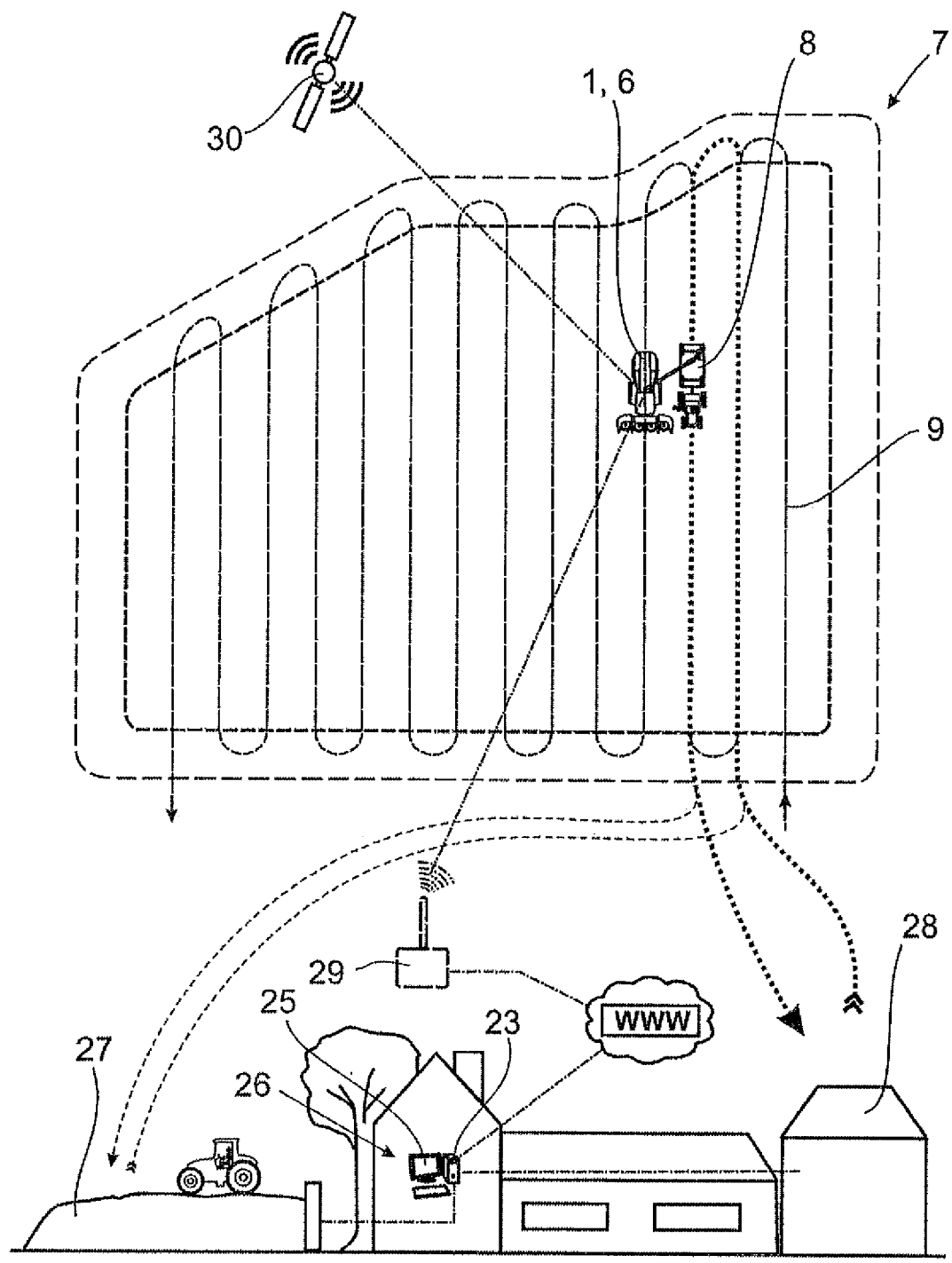
FIG. 1 shows a schematic top view of an agricultural harvesting system, according to the invention, comprising a harvesting machine during a harvesting process.

FIG. 1 shows a representation of how an agricultural harvesting machine 1 of an agricultural harvesting system, which is a forage harvester 6 in this case and preferably, harvests a field 7 in cooperation with a hauling vehicle 8. The field 7 is represented including suitable driving paths 9 which the agricultural harvesting machine 1 follows. The hauling vehicle 8 travels next to the agricultural harvesting machine 1, at least in sections, in order to intermittently pick up and transport crop 10 away. The crop 10, in this case and preferably, is chopped corn which is being transported by the hauling vehicle 8 either to a silo 27 for feed generation or to a biogas plant 28 which can also include a silo (not represented).

Further represented in FIG. 1 and as part of the agricultural harvesting machine 1 in this case, is an on-line data processing unit 11, i.e., a data processing unit which can process the received data preferably within an established period of time after the receipt thereof and, in particular, after the generation thereof, i.e., in real time. The on-line data processing unit 11 receives crop stream data from an NIR sensor unit 12 of the agricultural harvesting machine 1 and, on the basis of the crop stream data, generates control data for an adjusting unit 13 which, on the basis of these data, controls one or multiple working units 2, 3, 4, 5 or carries out at least one parameter adjustment of the particular working unit 2, 3, 4, 5.

For the purpose of generating the crop stream data, the NIR sensor unit 12 comprises an NIR sensor 14 which is situated in or on a conveyor channel 15 of the agricultural harvesting machine 1 and past which a crop stream S can be guided. A crop stream S means the chopped crop 10 generated by harvesting a field of crop 16, which flows through the conveyor channel 15 and is subsequently picked up and transported away by the hauling vehicle 8.

The NIR sensor unit 12 operates on the basis of near infrared spectroscopy and, therefore, is suitable for detecting constituents and/or properties of the crop stream S with the aid of the NIR sensor 14 and for generating crop stream data corresponding to the detected constituents and/or properties. The crop stream data are then transmitted by the NIR sensor unit 12 of the agricultural working machine 1 to the on-line data processing unit 11 which, in this case, is a component of the agricultural harvesting machine 1.

Figure 2:
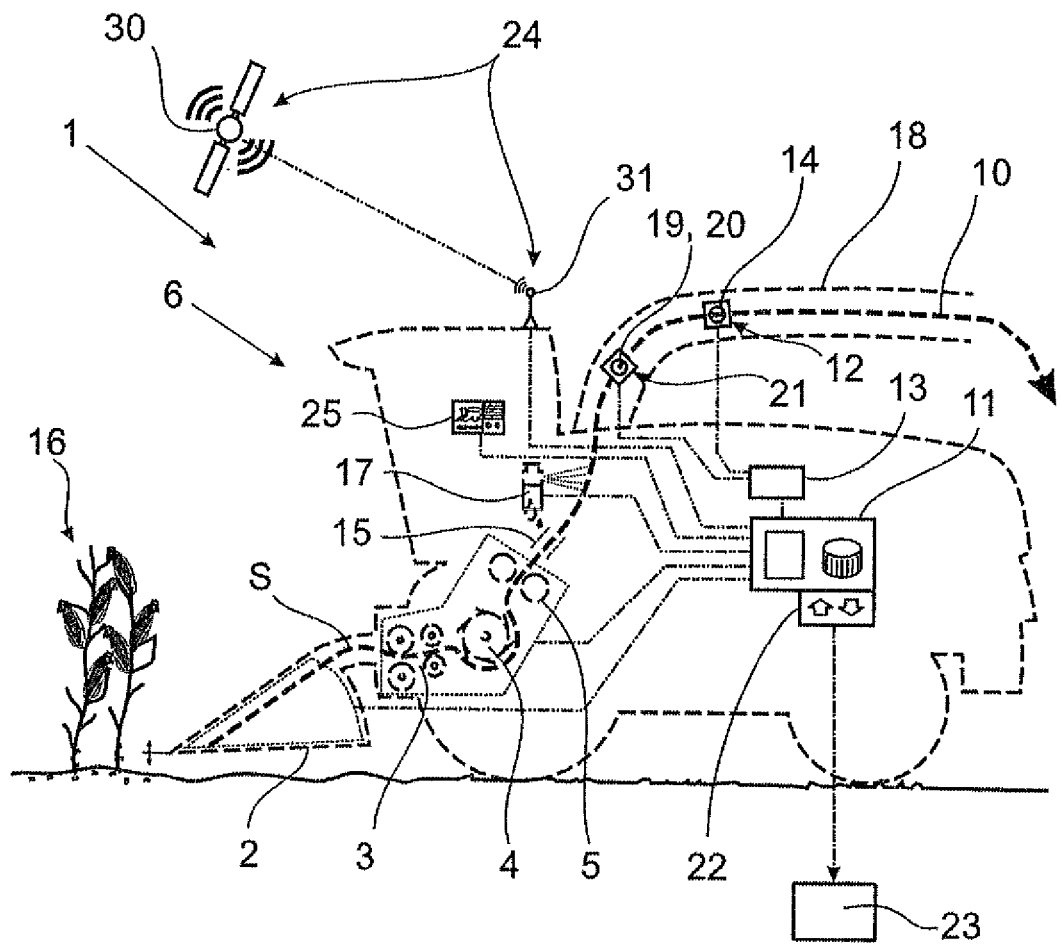
FIG. 2 shows a schematic side view of the agricultural harvesting machine of the agricultural harvesting system in FIG. 1.

FIG. 2 shows the agricultural harvesting machine 1 from FIG. 1 during a harvesting process, in which crop stream data are generated by way of harvesting a field of crop 16 and are transmitted to an on-line data processing unit 11.

As is apparent in FIG. 2, the crop stream S is guided through a conveyor channel 15 past multiple agricultural working units 2, 3, 4, 5 and, in this case and preferably, past an ensilage agent unit 17. The conveyor channel 15 begins at the front end of the agricultural harvesting machine 1, at the header 2, and ends at the end of the transfer pipe 18. Downstream from the header 2, the crop stream S is fed via a feed device 3 to a cutting cylinder 4 which further shreds the cut crop 10. Subsequent thereto, the crop stream S passes through a rechopper 5, a so-called cracker. Proceeding therefrom, the crop stream S is guided past the ensilage agent unit 17 in this case, which feeds an ensilage agent to the crop stream S. Subsequent thereto, the crop stream S passes an NIR sensor 14 which is situated in the transfer pipe 18 in this case, by way of example, although it can also be situated at another point, in principle. The NIR sensor 14 then detects constituents and/or properties of the crop stream S, wherein the NIR sensor unit 12 generates crop stream data corresponding to the detected constituents and/or properties, which are then transmitted by the NIR sensor unit 12 to the internal on-line data processing unit 11.

In the following, only a few specific applications of an on-line data processing unit 11 of the agricultural harvesting machine 1 of the agricultural harvesting system according to the invention are described, by way of example.

In one application, the on-line data processing unit 11 generates control data on the basis of the crop stream data generated by the NIR sensor unit 12, which enable the adjusting unit 13 to adjust the rechopper 5, i.e., carry out a parameter adjustment. The adjusting unit 13 can carry out an adjustment of the gap width and/or the drive power of the rechopper 5 as a parameter adjustment of the rechopper 5.

The NIR sensor 14 makes it possible, in this case and preferably, to measure the starch portion in particles which are guided past the NIR sensor 14 in the crop stream S, and to measure the moisture content thereof. The measured starch portion initially enables the on-line data processing unit 11 to ascertain which component of the harvested plant this is, i.e., whether these are kernels or fiber components. If the NIR sensor 14 ascertains, for example, a starch component of at least 70%, preferably of at least 80%, further preferably of at least 90%, the on-line data processing unit 11 recognizes that the particular particles that have just been detected by the NIR sensor 14 must be kernels or parts thereof. The moisture content, which is likewise measured by the NIR sensor 14, is then assigned by the on-line data processing unit 29 to the "kernel" plant component, whereby it is unambiguously established that the measured moisture content and, therefore, the dry mass content is that of the kernels in the crop flow S. The ascertained kernel dry mass content can then be compared by the on-line data processing unit 11 with corresponding setpoint values for the dry mass, whereupon, on the basis of the comparison results, the gap width and/or drive power of the rechopper 5 are adapted in such a way that the kernels are broken open in the rechopper 5 in the most optimal manner possible.

In order to assist the control of one or multiple working units 2, 3, 4, 5, in particular in order to assist the rechopper 5, the agricultural working system according to the invention can additionally comprise a so-called crop quality camera 20 as yet another sensor 19, i.e., a camera 20 which is configured for detecting external properties, in particular exclusively external properties, of the crop stream S. One corresponding further sensor unit 21 generates, on the basis of the crop properties and/or constituents detected by the further sensor 19, supplementary crop stream data and then transmits these data to the on-line data processing unit 11 or to a separate on-line data processing unit (not represented) which is likewise configured for processing the data in a temporally coupled manner, in particular for processing the data in real time. The one on-line data processing unit 11 or the further on-line data processing unit then generates suitable control data which are fed to the adjusting unit 13, in particular to the shared adjusting unit 13, in order to carry out the control. Since the NIR sensor 14 also operates highly reliably alone, an additional camera, in particular a crop quality camera, can also be dispensed with, whereby the manufacturing costs of the harvesting machine 1 can be reduced.

The control of the particular working unit 2, 3, 4, 5 or the parameter adjustment is then carried out, therefore, not solely on the basis of the crop stream data from the NIR sensor unit 12, but additionally with consideration for further data, in particular further crop stream data, i.e., the data corresponding to the detected further constituents and/or properties.

In yet another application, the on-line data processing unit 11 generates control data, with the aid of which the adjusting unit 13 carries out the adjustment of the length of cut of the crop 10 in the crop stream S as the parameter adjustment.

In this case, the NIR sensor 14 measures, in particular, the moisture content of the fiber components in the crop stream S, wherein the on-line data processing unit 11 deduces that the plant component is "raw fiber" when the NIR sensor 14 measures a starch portion of the particles guided past the NIR sensor of less than 70%, preferably of less than 60%, further preferably of less than 50%. The moisture content, which is likewise measured by the NIR sensor 14 in a corresponding manner, can then be assigned to the fiber components, which makes it possible to ascertain the dry mass content of the fiber components. If the dry mass content is relatively high, the adjusting unit 13 can shorten the length of cut on the basis of the control data received by the on-line data processing unit 11, in order to thereby optimize a downstream compression process in the silo. In the opposite case, the adjusting unit 13 makes it possible to correspondingly lengthen the length of cut when the dry mass content of the fiber components is comparatively low and the fiber components therefore have a relatively high moisture content.

An adjustment of the length of cut of the crop 10 can take place, for example, in that the speed of the feed device 3 and/or of the cutting cylinder 4 is changed.

In yet another application, it is possible, by means of the on-line data processing unit 11 and the adjusting unit 13, to carry out the adjustment of the cutting height of the crop 10 as the parameter adjustment.

A change in the cutting height can be required when a predefined portion of crude ash or sand in the crop stream S is exceeded, which can be measured by the NIR sensor 14. When the corresponding setpoint value for the portion of crude ash or sand is exceeded, this induces, for example, the adjusting unit 13 to increase the distance of the header 2 above the ground of the field of crop 16. The case is also conceivable in which the portion of raw fibers in the crop stream S is to be reduced, since a corresponding setpoint value has been exceeded, whereby the adjusting unit 13 likewise lifts the header 2. If, however, the portion of raw fibers in the crop stream S is to be increased, the adjusting unit 13 can automatically lower the header 2.

The above-described parameter adjustments are carried out, in the case of the agricultural harvesting system according to the invention or the harvesting machine 1 of the harvesting system and in the case of the method, according to the invention, for operating such a harvesting system, during the same harvesting process, in which the constituents and/or properties of the crop stream S are also detected by the NIR sensor 14, and therefore the harvesting process can be immediately adapted and optimized.

Finally, the agricultural harvesting system according to the invention and the method according to the invention can be additionally also utilized for controlling one or multiple agricultural working processes downstream from a harvesting process.

To this end, an off-line data processing unit 23 is represented in FIG. 1, i.e., a data processing unit which, in contrast to the on-line data processing unit, can process the received data temporally independently of the receipt thereof and/or temporally decoupled from the generation thereof. The off-line data processing unit 23 receives crop stream data from a data transmission unit 22 of the agricultural harvesting machine 1 and, on the basis of the crop stream data, generates control data for controlling an agricultural working process downstream from the harvesting process.

The NIR sensor unit 12, including the NIR sensor 14, likewise generates the crop stream data required for this purpose. The crop stream data are then transmitted by the data transmission unit 11 of the agricultural working machine 1 to the additional off-line data processing unit 23 which, in this case, is part of a data processing center 26 which is spatially separated from the agricultural harvesting machine 1. The transmission takes place wirelessly in this case and preferably, for example via a mobile radio network 29 which is connected to the Internet (www) in this case, wherein wireless local networks (WLAN) or other wireless communication protocols are likewise conceivable, in order to transmit the crop stream data to the off-line data processing unit 23.

In the following, only a few specific applications of an off-line data processing unit 23 of the agricultural harvesting machine 1 of the agricultural harvesting system according to the invention are described, by way of example.

In one exemplary embodiment, the off-line data processing unit 23 is configured for generating data regarding the chemical composition of the fruit of the harvested field of crop 16, in order to determine the quality of the fruit and, therefore, of the harvest. The term "chemical composition" includes, inter alia, the material composition. That is, in this case, the off-line data processing unit 23 can generate, from the crop stream data generated by the NIR sensor unit 12, data regarding, in particular, the protein content and/or the protein type and/or the sugar content and/or the starch content and/or the fat content (oil content) of the fruit of the harvested field of crop 16. The term "chemical composition" is also understood to mean the elemental composition, which means that, in yet another exemplary embodiment, the off-line data processing unit 23 can also generate the portions of different chemical elements (e.g., carbon, oxygen, hydrogen, nitrogen, sulphur, phosphorous, potassium, calcium, magnesium, iron, boron, manganese, zinc, copper, chlorine, and/or molybdenum, etc.).

According to yet another exemplary embodiment, the off-line data processing unit 23 can generate data regarding the harvesting yield of the harvested field of crop 16, i.e., regarding the quantity or amount of crop that was brought in.

According to yet another exemplary embodiment, it is conceivable that the off-line data processing unit 23 generates data regarding the structural composition of the harvested field of crop 16. The term "structural composition" includes, for example, the dry mass content and/or the raw fiber portion of the harvested field of crop 16.

In principle, it is also conceivable that the off-line data processing unit 23 generates data regarding the volumetric or gravimetric energy density of the harvested field of crop 16. The particular data generated by the off-line data processing unit 23 are then compared with corresponding reference data. If the off-line data processing unit 23 generates data, for example, regarding the protein content of the fruit, the reference data correspond to predefined setpoint values or setpoint value ranges for the protein content. Or, if the off-line data processing unit 23 generates data, for example, regarding the protein type of the fruit, the reference data correspond to predefined setpoint values or setpoint value ranges which are suitable for defining the protein type. Any deviations from or matches with the reference data, i.e., setpoint values or setpoint value ranges, can be established by means of the comparison and can be utilized for determining the quality of the harvested field of crop 16. The result of the comparison between the data generated by the off-line data processing unit 23 and the corresponding reference data is then utilized, in the form of control data which are likewise generated by the off-line data processing unit 23, for controlling at least one agricultural working process downstream from the harvesting process.

FIG. 1 also shows that the agricultural harvesting system 1 also comprises a position-finding system 24 including a GPS satellite 30 and a geosensor 31 (GPS sensor) situated on the agricultural harvesting machine 1. In this way, the on-line data processing unit 11 and/or the off-line data processing unit 23 can assign geodata generated by the position-finding system 24 to the crop stream data which have been generated by the NIR sensor unit 12 and similarly also process georeferenced crop stream data. This makes it possible, in turn, to obtain findings regarding the quality and quantity of the crop field 16 which was previously harvested, in very specific regions of a field 7 or in a specific field 7 within a cutting area and, in particular, to vary the control of the subsequent agricultural working process within the field 7 or within the cutting area and, overall, to optimize the processing of the entire field 7 or the entire cutting area.

The crop stream data, reference data, control data, and/or geodata can finally also be displayed by a display unit 25. The display unit can be a component of the data processing center 26 (FIG. 1) and/or of the harvesting machine (FIG. 2).

The control data generated by the off-line data processing unit 23, which also allows for an estimation of the quality and quantity of the harvested field of crop 16 or of the fruit of the harvested field of crop 16, can be utilized for controlling one or multiple of the following working processes as the agricultural working process downstream from the harvesting process:

the seed selection and/or selection of the crop rotation for a subsequent sowing process, and/or the selection of the seed quantity for a subsequent sowing process, and/or the selection of the seed distribution on a field 7 to be subsequently sowed, and/or the control of the seed distribution on a field 7 during a subsequent sowing process, and/or the fertilizer selection for a subsequent fertilizing process, and/or the selection of the fertilizer quantity for a subsequent fertilizing process, and/or the selection of the fertilizer distribution on a field 7 to be subsequently fertilized, and/or the control of the fertilizer distribution on a field 7 during a subsequent fertilizing process, and/or the selection of the type of soil management (plowing, harrowing, or the like) of a field 7, and/or the control of at least one working unit (plow, harrow, or the like) during a soil management of a field 7, and/or the selection of the type of use (use as animal feed or as a substrate in a biogas plant) of the crop 10 flowing through the conveyor channel 15.

In conclusion, it is emphasized again that, according to the invention, both the particular on-line data processing unit as well as the off-line data processing unit can generate control data on the basis of crop stream data received by an NIR sensor unit, In this case, the NIR sensor unit can generate the crop stream data on the basis of one or multiple of the above-described constituents and/or properties of the crop stream detected by an NIR sensor (protein content, protein type, sugar content, starch content, fat content, and/or dry mass content, etc. of the kernel; dry mass content, raw fiber portion, crude ash portion, volumetric energy density, and/or gravimetric energy density, etc., of the crop).

In principle, it is conceivable that both the particular on-line data processing unit as well as the off-line data processing unit are configured for carrying out, on the basis of the received crop stream data, at least one parameter adjustment of at least one working unit of the type described above, and/or a control of at least one agricultural working process of the type described above, which is downstream from the harvesting process.

LIST OF REFERENCE NUMBERS 1 agricultural harvesting machine
2 header
3 feed device
4 cutting cylinder
5 rechopper, cracker
6 forage harvester
7 field
8 hauling vehicle
9 driving path
10 crop
11 on-line data processing unit
12 NIR sensor unit
13 adjusting unit
14 NIR sensor
15 conveyor channel
16 field of crop
17 ensilage agent unit
18 transfer pipe
19 further sensor
20 camera
21 further sensor unit
22 data transmission unit
23 off-line data processing unit 24 position-finding system
25 display device
26 data processing center
27 silo
28 biogas plant
29 mobile radio network
30 GPS satellite
31 geosensor
S crop stream

What is claimed is:

1. An agricultural harvesting system comprising:
an agricultural harvesting machine that includes at least one agricultural working unit which is configured for assisting or performing agricultural work,
an adjusting unit for adjusting parameters of the at least one working unit,
a conveyor channel for a crop stream generated in a harvesting process by harvesting a field of crop,
an NIR sensor unit containing an NIR sensor which is configured for detecting constituents or properties of the crop stream, wherein the conveyor channel is configured to guide the crop stream past the NIR sensor, and
an on-line data processing unit for controlling the at least one working unit, said on-line data processing unit being configured for generating control data on the basis of crop stream data which have been generated by the NIR sensor unit and which correspond to the constituents or properties detected by the NIR sensor, wherein the adjusting unit is configured for carrying out a parameter adjustment of the at least one working unit at least on the basis of the control data.

2. The agricultural harvesting system as claimed in claim 1, wherein the at least one working unit comprises a rechopper for the crop in the crop stream, wherein the on-line data processing unit is configured for generating data regarding the dry mass content or the starch portion of fruit of the harvested field of crop, carrying out a comparison of the generated data with reference data and, on the basis of the comparison, generating the control data for carrying out the parameter adjustment of the rechopper, and wherein the adjusting unit is configured for carrying out an adjustment of a gap width or a drive power of the rechopper as the parameter adjustment.

3. The agricultural harvesting system as claimed in claim 1, wherein the at least one working unit comprises a header, wherein the on-line data processing unit is configured for generating data regarding a raw fiber portion of the harvested field of crop, carrying out a comparison of the generated data with reference data and, on the basis of the comparison, generating the control data for carrying out the parameter adjustment of the header, and wherein the adjusting unit is configured for carrying out an adjustment of a cutting height of the crop as the parameter adjustment.

4. The agricultural harvesting system as claimed in claim 1, wherein the at least one working unit comprises a header, wherein the on-line data processing unit is configured for generating data regarding a crude ash portion of the harvested field of crop, carrying out a comparison of the generated data with reference data and, on the basis of the comparison, generating the control data for carrying out the parameter adjustment of the header, and wherein the adjusting unit is configured for carrying out an adjustment of the cutting height of the crop as the parameter adjustment.

5. The agricultural harvesting system as claimed in claim 1, wherein the at least one working unit comprises a feed device and a cutting cylinder, wherein the on-line data processing unit is configured for generating data regarding the dry mass content of the harvested field of crop, carrying out a comparison of the generated data with reference data and, on the basis of the comparison, generating the control data for carrying out the parameter adjustment of the feed device or the cutting cylinder, and the adjusting unit is configured for carrying out the adjustment of a length of cut of the crop as the parameter adjustment.

6. The agricultural harvesting system as claimed claim 1, wherein the at least one agricultural working unit comprises a feed device and a cutting cylinder, wherein the on-line data processing unit is configured for generating data regarding the raw fiber portion of the harvested field of crop, carrying out a comparison of the generated data with reference data and, on the basis of the comparison, generating the control data for carrying out the parameter adjustment of the feed device or the cutting cylinder, and wherein the adjusting unit is configured for carrying out an adjustment of a length of cut of the crop as the parameter adjustment.

7. The agricultural harvesting system as claimed in claim 1, wherein the agricultural harvesting machine further comprises a data transmission unit which is configured for transmitting the crop stream data to an off-line data processing unit for the processing of the crop stream data in a manner temporally decoupled from the generation or receipt thereof.

8. The agricultural harvesting system as claimed in claim 7, wherein at least one of the off-line data processing unit and the on-line data processing unit is configured for generating, at least on the basis of crop stream data generated by the NIR sensor unit, data regarding the chemical composition of fruit of the harvested field of crop, carrying out a comparison of the generated data with reference data and, on the basis of the comparison, generating control data for controlling an agricultural working process downstream from the harvesting process.

9. The agricultural harvesting system as claimed in claim 7, wherein, at least one of the off-line data processing unit and the on-line data processing unit is configured for generating, at least on the basis of the crop stream data generated by the NIR sensor unit, data regarding at least one of protein content, protein type, sugar content, starch content and fat content of the fruit of the harvested field of crop, carrying out a comparison of the generated data with reference data and, on the basis of the comparison, generating control data for controlling an agricultural working process downstream from the harvesting process.

10. The agricultural harvesting system as claimed in claim 7, wherein at least one of the off-line data processing unit and the on-line data processing unit is configured for generating, at least on the basis of crop stream data generated by the NIR sensor unit, data regarding harvesting yield of the harvested field of crop, carrying out a comparison of the generated data with reference data and, on the basis of the comparison, generating control data for controlling an agricultural working process downstream from the harvesting process.

11. The agricultural harvesting system as claimed in claim 7, wherein at least one of the off-line data processing unit and the on-line data processing unit is configured for generating, at least on the basis of crop stream data generated by the NIR sensor unit, data regarding the structural composition of the harvested field of crop, carrying out a comparison of the generated data with reference data and, on the basis of the comparison, generating control data for controlling an agricultural working process downstream from the harvesting process.

12. The agricultural harvesting system as claimed in claim 7, wherein at least one of the off-line data processing unit and the on-line data processing unit is configured for generating, at least on the basis of crop stream data generated by the NIR sensor unit, data regarding the dry mass content or the raw fiber portion of the harvested field of crop, carrying out a comparison of the generated data with reference data and, on the basis of the comparison, generating control data for controlling an agricultural working process downstream from the harvesting process.

13. The agricultural harvesting system as claimed in claim 7, wherein at least one of the off-line data processing unit and the on-line data processing unit is configured for generating, at least on the basis of crop stream data generated by the NIR sensor unit, data regarding the volumetric energy density or gravimetric energy density of the harvested field of crop, carrying out a comparison of the generated data with reference data and, on the basis of the comparison, generating control data for controlling an agricultural working process downstream from the harvesting process.

14. The agricultural harvesting system as claimed in claim 8, wherein the agricultural working process includes at least one of the following:
  seed selection and/or selection of crop rotation for a subsequent sowing process,
  selection of seed quantity for a subsequent sowing process,
  selection of seed distribution on a field to be subsequently sowed,
  control of seed distribution on a field during a subsequent sowing process,
  fertilizer selection for a subsequent fertilizing process,
  selection of fertilizer quantity for a subsequent fertilizing process,
  selection of fertilizer distribution on a field to be subsequently fertilized,
  control of fertilizer distribution on a field during a subsequent fertilizing process,
  selection of the type of soil management of a field,
  control of the at least one working unit during a soil management of a field, and
  selection of a type of use of the crop flowing through the conveyor channel.

15. The agricultural harvesting system as claimed in claim 7, wherein the off-line data processing unit is further configured for generating additional control data for the adjusting unit on the basis of crop stream data which have been generated by the NIR sensor unit and which correspond to the constituents or properties detected by the NIR sensor, and wherein the adjusting unit is configured for additionally adjusting the working unit on the basis of the additional control data.

16. The agricultural harvesting system as claimed in claim 7, wherein the off-line data processing unit is configured for at least one of the following processes:
  generating data regarding the dry mass content or starch portion of the fruit of the harvested field of crop, carrying out a comparison of the generated data with reference data and, on the basis of the comparison, generating the control data for carrying out the parameter adjustment of the working unit in the form of a rechopper, wherein the parameter to be adjusted is a gap width or the drive power of the rechopper,
  generating data regarding the raw fiber portion of the harvested field of crop, carrying out a comparison of the generated data with reference data and, on the basis of the comparison, generating the control data for carrying out the parameter adjustment of the working unit in the form of a header, wherein the parameter to be adjusted is a cutting height of the crop,
  generating data regarding the crude ash portion of the harvested field of crop, carrying out a comparison of the generated data with reference data and, on the basis of the comparison, generating the control data for carrying out the parameter adjustment of the header, wherein the parameter to be adjusted is a cutting height of the crop,
  generating data regarding the dry mass content of the harvested field of crop, carrying out a comparison of the generated data with reference data and, on the basis of the comparison, generating the control data for carrying out the parameter adjustment of the working unit in the form of a feed device or a cutting cylinder, wherein the parameter to be adjusted is a length of cut of the crop, and
  generating data regarding the raw fiber portion of the harvested field of crop, carrying out a comparison of the generated data with reference data and, on the basis of the comparison, generating the control data for carrying out the parameter adjustment of the feed device or the cutting cylinder, wherein the parameter to be adjusted is a length of cut of the crop.

17. The agricultural harvesting system as claimed in claim 7, further comprising at least one of the following:
  a camera configured for detecting external properties of the crop stream,
  a position-finding system, wherein the off-line data processing unit or the on-line data processing unit are configured for assigning geodata generated by the position-finding system to the crop stream data or processing georeferenced crop stream data, and
  a display unit configured for displaying the crop stream data, the reference data, the control data, or the geodata.

18. The agricultural harvesting system as claimed in claim 7, wherein at least one of the on-line data processing unit and the off-line data processing unit is a component of the agricultural harvesting machine or of a data processing center spatially separated from the agricultural harvesting machine.

19. A method for operating an agricultural harvesting system as claimed in claim 7, comprising generating control data with the data processing unit for controlling the working unit on the basis of crop stream data which have been generated by the NIR sensor unit and correspond to the constituents or properties detected by the NIR sensor, and carrying out with the adjustment unit a parameter adjustment of the working unit at least on the basis of the control data.

20. The method as claimed in claim 19, further comprising the step of transmitting with the transmission unit crop stream data, which have been generated by the NIR sensor unit and correspond to the constituents or properties detected by the NIR sensor, to the off-line data processing unit, and processing with the off-line data processing unit the crop stream data in a manner temporally decoupled from the generation or receipt thereof.

* * * * *